United States Patent
Ihs et al.

(10) Patent No.: US 9,461,543 B2
(45) Date of Patent: *Oct. 4, 2016

(54) DC-DC CONVERTER WITH DIGITAL CURRENT SENSING

(71) Applicant: Endura Technologies LLC, San Diego, CA (US)

(72) Inventors: Hassan Ihs, Vendargues (FR); Taner Dosluoglu, New York, NY (US)

(73) Assignee: Endura Technologies LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/593,987

(22) Filed: Jan. 9, 2015

(65) Prior Publication Data
US 2016/0156265 A1 Jun. 2, 2016

Related U.S. Application Data

(60) Provisional application No. 62/086,038, filed on Dec. 1, 2014.

(51) Int. Cl.
| | | |
|---|---|---|
| *H02M 3/158* | (2006.01) | |
| *H02M 3/157* | (2006.01) | |
| *H02M 3/156* | (2006.01) | |
| *H02M 3/155* | (2006.01) | |

(52) U.S. Cl.
CPC .............. *H02M 3/158* (2013.01); *H02M 3/155* (2013.01); *H02M 3/156* (2013.01); *H02M 3/157* (2013.01)

(58) Field of Classification Search
CPC .............. G05F 1/00; G05F 1/10; G05F 1/24; G05F 1/40; G05F 1/445; G05F 1/46; G05F 1/56; G05F 1/562; G05F 1/565; G05F 1/575; G05F 1/59; G05F 1/595; G05F 3/16; G05F 3/10; G05F 3/08; H02M 3/137; H02M 3/139; H02M 3/155; H02M 3/156; H02M 3/157

See application file for complete search history.

(56) References Cited

U.S. PATENT DOCUMENTS

| | | | |
|---|---|---|---|
| 2001/0046145 A1 | 11/2001 | Oknaian et al. | |
| 2009/0115388 A1* | 5/2009 | Miyazaki | H02M 3/158 323/282 |
| 2013/0194845 A1 | 8/2013 | Bianco et al. | |

FOREIGN PATENT DOCUMENTS

| | | |
|---|---|---|
| JP | 2006-296090 A | 10/2006 |
| JP | 2014-171276 A | 9/2014 |
| KR | 10-2011-0048309 A | 5/2011 |

OTHER PUBLICATIONS

International Search Report on related PCT Application No. PCT/US2015/063254 from International Searching Authority (KIPO) dated Mar. 28, 2016.
Written Opinion on related PCT Application No. PCT/US2015/063254 from International Searching Authority (KIPO) dated Mar. 28, 2016.

* cited by examiner

*Primary Examiner* — Fred E Finch, III
*Assistant Examiner* — Rafael O De Leon Domenech
(74) *Attorney, Agent, or Firm* — Klein, O'Neill & Singh, LLP

(57) ABSTRACT

A regulated DC-DC switching converter includes a bypass mode in which ends of an output inductor are coupled together. Circuitry determines output capacitor current and load current components of output inductor current during operation of the switching converter, for use in controlling switching operations.

7 Claims, 5 Drawing Sheets

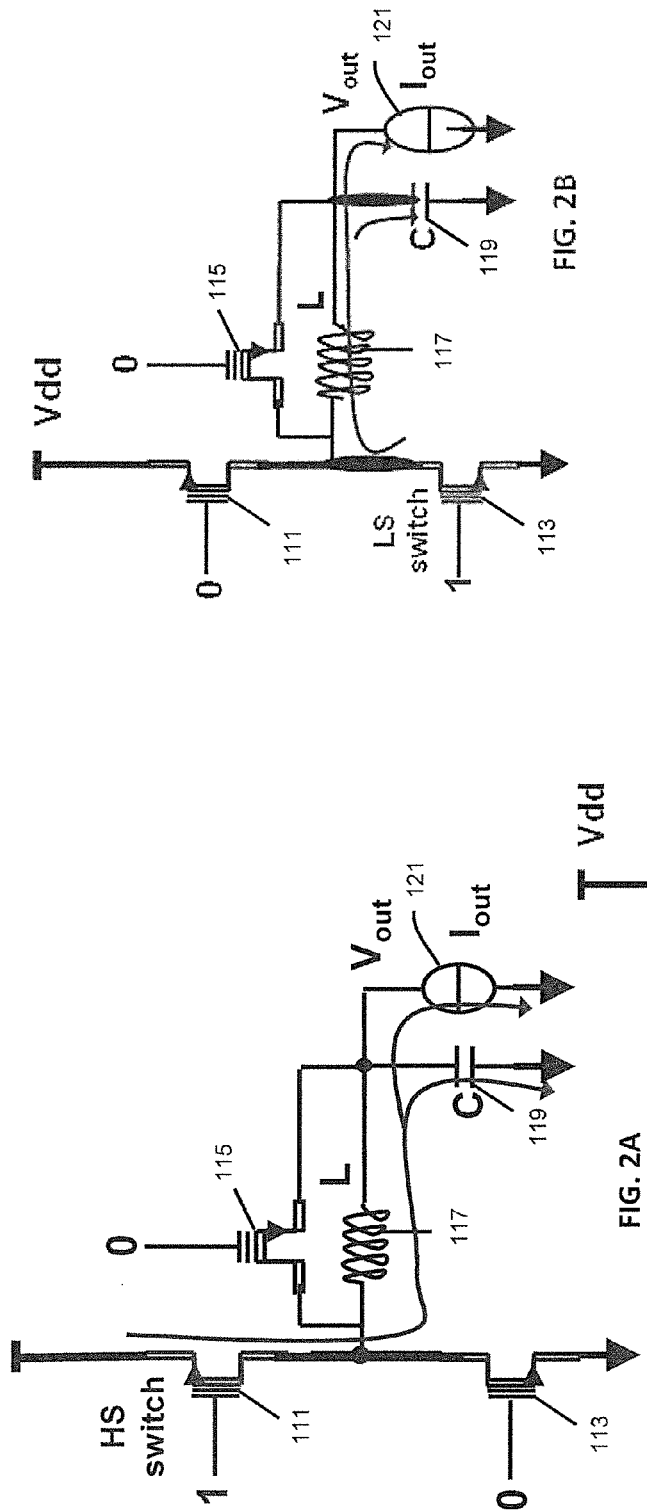
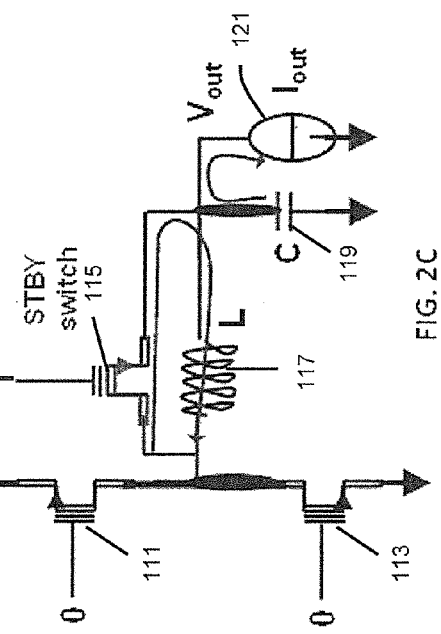
FIG. 2A
FIG. 2B
FIG. 2C

DC-DC CONVERTER WITH DIGITAL CURRENT SENSING

CROSS REFERENCE TO RELATED APPLICATIONS

This application claims the benefit of the filing date of U.S. Provisional Patent Application No. 62/086,038, filed on Dec. 1, 2014, the disclosure of which is incorporated by reference herein.

BACKGROUND OF THE INVENTION

The present invention relates generally to regulated DC-DC voltage converters, and more particularly to determining current in an inductor of a regulated DC-DC voltage converter.

Regulated DC-DC voltage converters generally provide for regulated power to operational circuitry, for example integrated circuits in semiconductor devices used in a wide variety of applications. Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

Provision of large amounts of power to integrated circuits may be potentially damaging to the devices. For this reason, and others, regulated voltage converters may attempt to monitor current provided to a load through an output inductor of the voltage converter. This may be accomplished, for example, by measuring a voltage drop across a resistive element in series with the output inductor. Unfortunately, such monitoring may result in excessive waste of available power if performed constantly, or even on a regular basis.

In addition, in many cases power requirements of the operational circuitry may vary greatly, and vary greatly within short time frames. Properly controlling converter operation in the face of sudden changes in desired output power may be difficult to accomplish. This difficulty may be increased if information regarding current being supplied by the converter towards the load is not available. Again, unfortunately, waste of available power to perform current monitoring may be particularly undesirable during times of sudden surges in desired output power.

BRIEF SUMMARY OF THE INVENTION

Aspects of the invention relate to DC-DC switching converters and to determination of output inductor current in DC-DC switching converters. One aspect of the invention provides a method of determining output inductor current for a DC-DC switching regulator including a bypass switch coupling ends of the output inductor and an output capacitor, comprising: determining a first change in capacitor voltage of the output capacitor over a first time period during which the bypass switch is open; determining a first capacitor current value based on the first change in capacitor voltage, the first time period, and a capacitance of the capacitor; determining a second change in capacitor voltage of the output capacitor over a second time period during which the bypass switch is closed; determining a second capacitor current value based on the second change in capacitor voltage, the second time period, and the capacitance of the capacitor; and summing the first capacitor current value and the second capacitor current value to obtain an indication of output inductor current.

Another aspect of the invention provides A method useful in controlling a switching voltage regulator having a bypass switch coupled across an output inductor, with the bypass switch closed in a bypass mode and open otherwise, the output inductor having one end coupled to a node between a high side s itch and a low side switch of the switching regulator and another end coupled to an output capacitor, the method comprising: determining a first capacitor current of the output capacitor; determining whether the bypass mode is enabled for a present clock cycle; if the bypass mode is enabled for the present clock cycle, setting an output current value based on the first capacitor current; if the bypass mode is not enabled for the present clock cycle, setting a second capacitor current value based on the first capacitor current; and determining an inductor current of the output inductor based on the output current value and the second capacitor current value.

These and other aspects of the invention are more fully comprehended upon review of this disclosure.

BRIEF DESCRIPTION OF THE FIGURES

FIGS. 2A, 2B, 2C illustrate the operation of the converter of FIG. 1.

DETAILED DESCRIPTION

Figure 1:
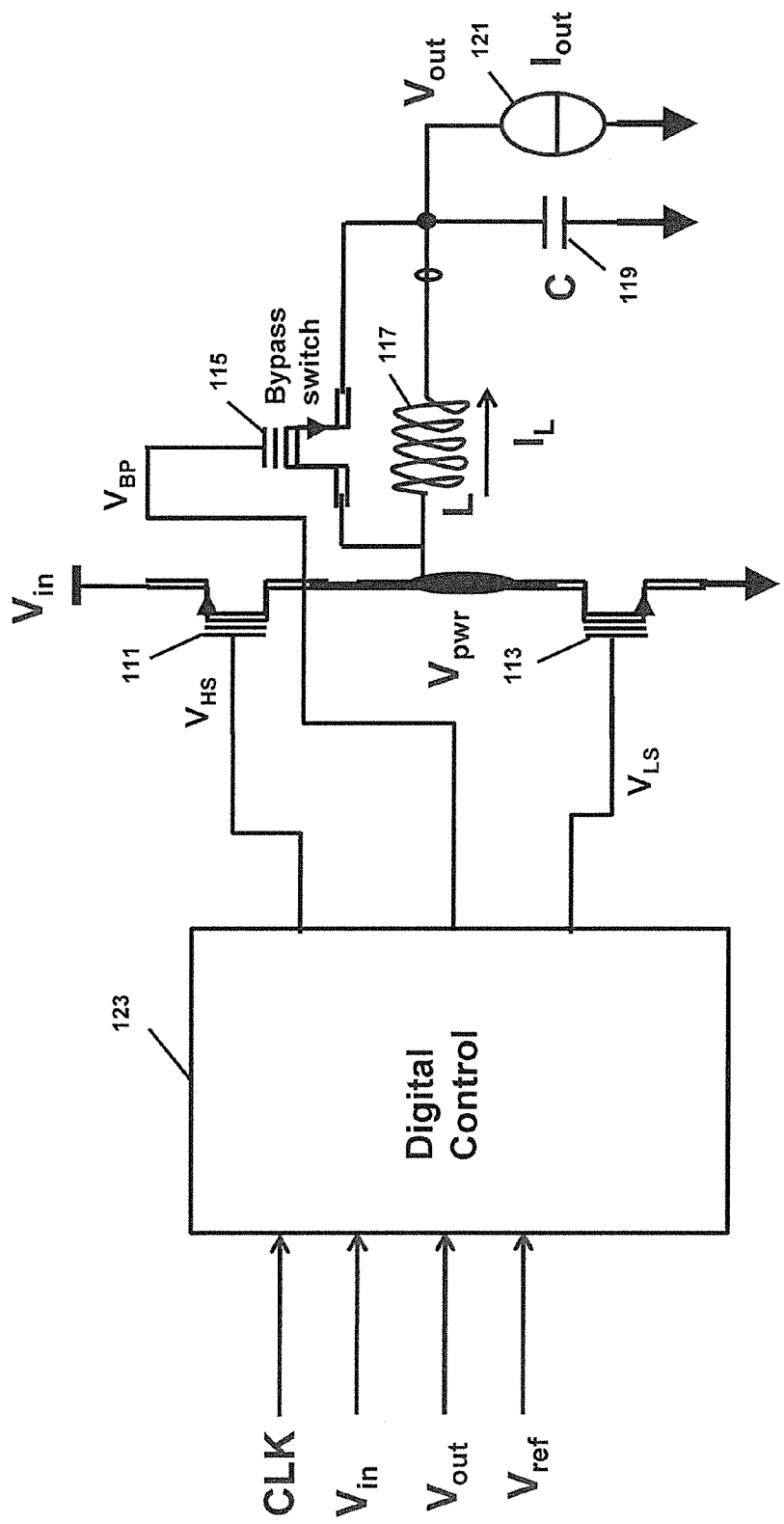
FIG. 1 is a circuit diagram of a regulated DC-DC switching converter in accordance with an embodiment.

FIG. 1 is a circuit diagram of a regulated DC-DC converter in accordance with an embodiment. Referring to FIG. 1, the converter includes a high side switch 111, a low side switch 113, a bypass switch 115, an output inductor 117, an output capacitor 119 and a controller 121 controlling the high side switch, low side switch, and bypass switch. The switches may be formed, for example, with MOSFET transistors, with a p-channel MOS transistor forming the high side switch and n-channel MOS transistors forming the switches low side and bypass switches. A first terminal of the high side switch is connected to a voltage source providing an input voltage. A second terminal of the high side switch is connected to a first terminal of the output inductor, a first terminal of the low side switch and a first terminal of the bypass switch. A second terminal of the low side switch is connected to a low voltage source, e.g. a ground. A second terminal of the output inductor is connected to a second terminal of the bypass switch, and to a first terminal of the output capacitor, which supplies an output voltage to a terminal of a load 123 having another terminal connected to the ground. The output voltage is generally lower than the input voltage. The second terminal of the output capacitor is connected to the ground.

The controller may receive a signal indicative of output voltage, input voltage, output inductor current, and possibly other signals for use in performing regulation functions, generally effected by way of opening or closing the high side, low side, and bypass switches. The controller generally controls state of the high side, low side, and bypass switches by way of forming control signals for controlling those switches. Generally, the controller is configured to generate the control signals as a function of input and output voltages, the output inductor current, and possibly the load current. The control signals are generally exclusive in closing the high side, low side, and bypass switches, so that at any time not more than one of the switches is closed whereas the others of the switches are open.

FIGS. 2A, 2B, 2C illustrate the operation of the converter of FIG. 1. In FIG. 2A, the high side switch is on (closed), whereas the low side and bypass switches are open. Thus a current flows from the voltage source supplying input voltage through the output inductor, through the capacitor and to the load. In FIG. 2B, the low side switch is on, whereas the high side and bypass switches are open. Thus a current flows through the output inductor, through the capacitor and through the load to the ground. For the situation of both FIGS. 2A and 2B, the inductor current has a component associated with the capacitor and a component associated with the load. The current component associated with the capacitor is the product of the capacitance of the capacitor and the derivative with respect to time of the capacitor voltage, or $I_c = C\,dv/dt$. In the digital domain this may be approximated by $I_{cn} = C(V_n - V_{n-1})/T$ or $I_{cn}(z) = (C/T)V(1-z^{-1})$, with T being time between samples.

In FIG. 2C, the bypass switch is on, whereas the high side and low side switches are open. Thus current flows in the loop formed by the output inductor and the capacitor discharges through the load. In this state, the load current is supplied exclusively by the capacitor. With the load current supplied exclusively by the capacitor $I_{out} = C\,dv/dt$, which may be approximated in the digital domain by $I_{out_n} = C(V_n - V_{n-1})/T$ or $I_{out}(z) = (C/T)V(1-z^{-1})$, with T being time between samples.

Generally, during operation of regulated switching converter including the circuitry of FIGS. 2A-C, load current should be generally constant as the switch states vary. The inductor current, therefore, is the sum of the capacitor current $I_c$ determined when the converter is in a state as indicated by FIGS. 2A or 2B and the load current $I_{out}$ determined when the converter is in a state as indicated by FIG. 2C, or $I_L = I_c + I_{out}$.

Figure 3:
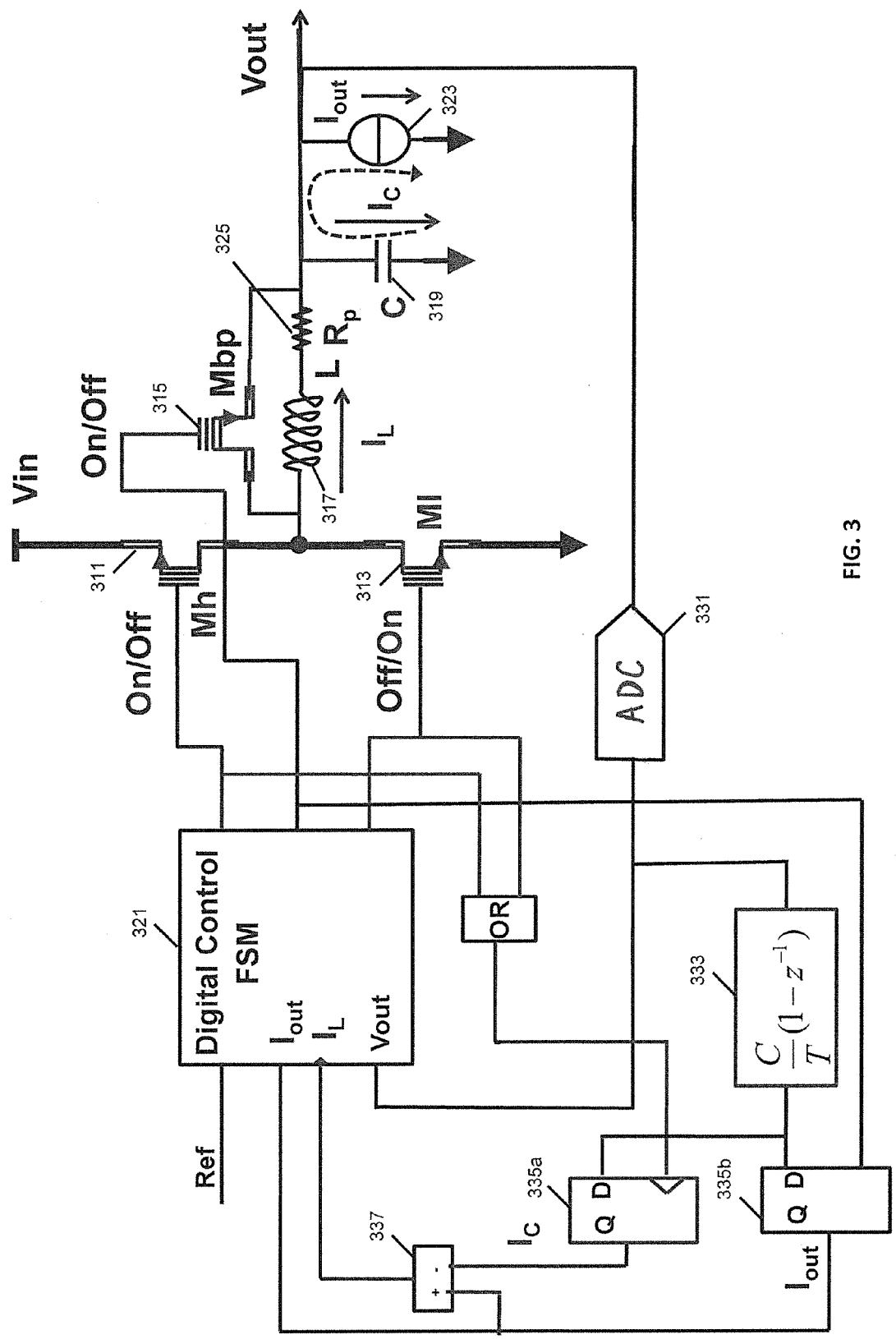
FIG. 3 is a circuit diagram of a regulated DC-DC switching converter including inductor output determination circuitry in accordance with aspects of the invention.

FIG. 3 is a circuit diagram of a regulated DC-DC switching converter including inductor output determination circuitry in accordance with aspects of the invention. As with the regulated DC-DC switching converter of FIG. 1, the converter includes a high side switch 311, a low side switch 313, a bypass switch 315, an output inductor 317, an output capacitor 319 and a controller 321 controlling the high side switch, low side switch, and bypass switch. The high side switch and the low side switch are coupled in series between a first voltage source and a second voltage source. The first voltage source is at a higher voltage than the second voltage source, with the high side switch coupling the first voltage source to the low side switch, and the low side switch coupling the second voltage source to the high side switch.

The output inductor has one end coupled to a node between the high side switch and the low side switch. Another end of the output inductor is coupled to the output capacitor and a load 323. For illustrative purposes, the other end of the output inductor also shows a parasitic resistance 325, with the parasitic resistance for example being provided by the output inductor and associated circuit paths.

As with the switching converter of FIG. 1, the controller may receive a signal indicative of output voltage, input voltage, output inductor current, and possibly other signals for use in performing regulation functions, generally effected by way of opening or closing the high side, low side, and bypass switches. The controller generally controls state of the high side, low side, and bypass switches by way of forming control signals for controlling those switches. Generally, the controller is configured to generate the control signals as a function of input and output voltages, the output inductor current, and possibly the load current. The control signals are generally exclusive in closing the high side, low side, and bypass switches, so that at any time not more than one of the switches is closed whereas the others of the switches are open. An inductor current $I_L$ passes through the inductor. When the high side or low side switches are closed the inductor current provides a capacitor current and a load current $I_{out}$. When instead the bypass switch is closed the inductor current loops through the bypass switch, and the load current $I_{out}$ is provided by the capacitor, with the current provided by the capacitor shown as a dashed line in FIG. 3.

Figure 4:
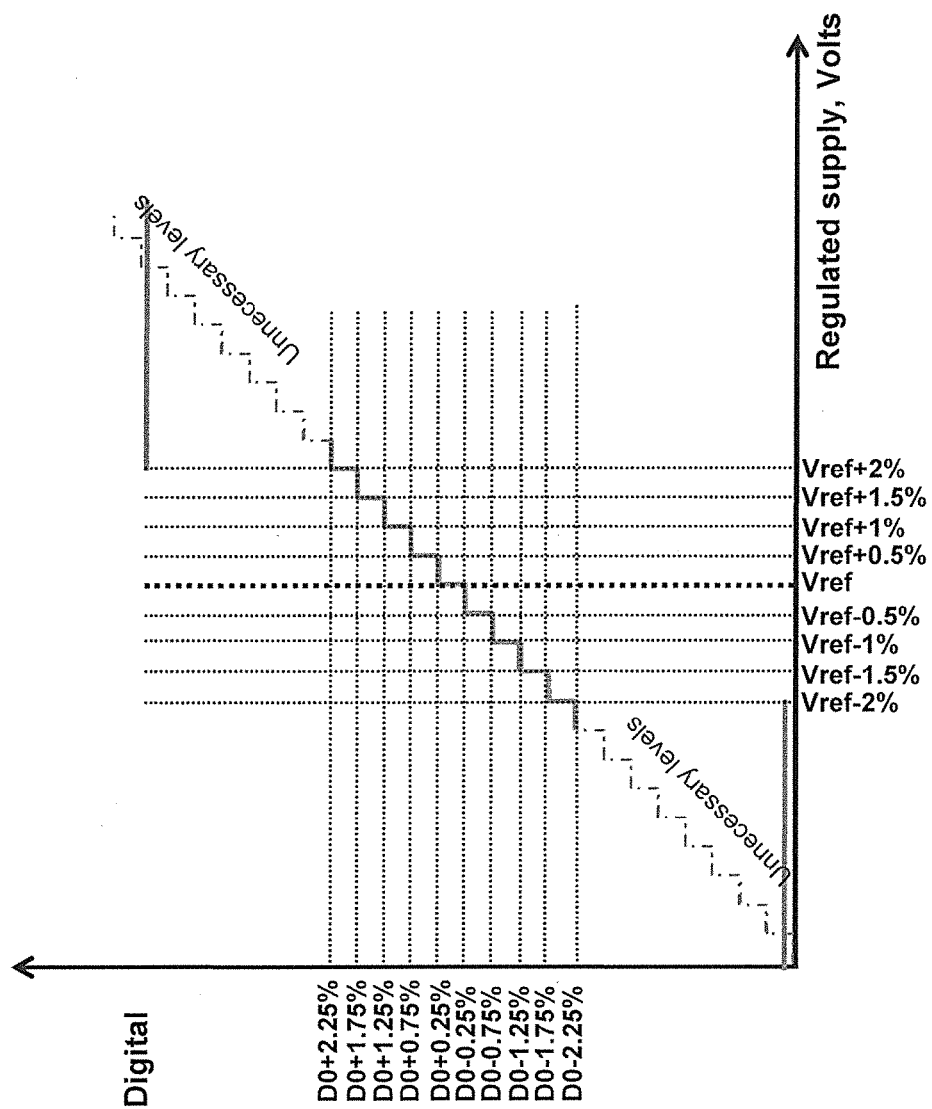
FIG. 4 is a chart showing comparator voltage configurations for an analog-to-digital comparator useful in accordance with aspects of the invention.

An analog to digital converter (ADC) 331 is also coupled to a node between the output inductor, output capacitor, and load. The ADC converts a voltage signal on the node to a digital value. As the node is coupled to an output of the output capacitor, the voltage signal may be considered an output capacitor voltage (or simply output voltage, regulated voltage, or load voltage), and the digital value may be termed a digital output capacitor voltage. In some embodiments the ADC provides greater than 8 bits of output. In various embodiments the ADC provides greater than 8 bits of meaningful output across a range within 2% of expected or desired output voltages of the output capacitor during voltage regulation of power to the load. In some embodiments the ADC includes at least 10 comparators configured to compare the output capacitor voltage with different reference voltages each within about 2% of the expected or desired output voltages of the output capacitor during voltage regulation of power to the load. As shown in the chart of FIG. 4, in some embodiments five comparators are configured to compare the output capacitor voltage with voltage levels between 100.25% of the reference voltage and 102.25% of the reference voltage level, with an additional five comparators configured to compare the output capacitor voltage with voltage levels between 97.75% and 99.75% of the reference voltage.

The digital output capacitor voltage is provided to the controller, and to a current determination block 333. The current determination block effectively determines an indication of capacitor current. In doing so, in most embodiments the current determination block makes use of a relationship between capacitor current and changes in capacitor voltage over time, which is proportional to capacitance of the capacitor. In general, for a capacitor, $I = C^* dv/dt$, which may be approximated by $I = C^*(V_n - V_{(n-1)})/(t_n - t_{(n-1)})$. Accordingly, in some embodiments, the current determination block includes a latch or other memory for storing the digital output capacitor voltage as sampled at a first time, circuitry for determining a difference between that stored digital output capacitor voltage and the digital output capacitor voltage as sampled at a second time, circuitry for dividing that value by a value indicative of a difference between the second time and the first time (or multiplying that value by the inverse of the difference in time), and scaling the result by a scalar indicative of capacitance of the output capacitor. In some embodiments the difference in time between the first time and the second time are known, for example known to be a single clock cycle or a predetermined number of clock cycles of a clock signal provided to the current determination block, and the current determination block may use a constant instead of determining time differences. Similarly, order of operations of the current determination block may also be varied in terms of order applied, and the digital output capacitor voltage may be stored for both the first sampling and the second sampling.

The indication of capacitor current is provided to a first latch 335a and a second latch 335b. The first latch stores the indication of capacitor current when either the high side switch or the low side switch is active (closed), as diagrammatically shown in FIG. 3 by way of inclusion of an OR block 339 receiving signals from the controller indicating commanded states of the high side and low side switches. In some embodiments, however, the first latch may instead store the indication of capacitor current when the bypass switch is commanded to be open. Similarly, the second latch stores the indication of capacitor current when the bypass switch is commanded to be closed.

In some embodiments the controller, during its normal operation, activates all of the high side, low side, and bypass switches on a sufficiently regular basis that indications of capacitor current stored by the latches are up to date. In some embodiments, however, the controller may not, during regular operation, always activate the bypass switch on a regular basis. Accordingly, in some embodiments the controller is additionally programmed or configured to activate the bypass switch, in exclusion to the high side and low side switches, if the bypass switch has not been activated for a predefined period of time.

The indications of capacitor current stored in the first latch and the second latch are provided to a summer 337, which sums those values, and provides the sum to the controller.

In situations where the first latch stores the indication of capacitor current, the indication of capacitor current stored by the first latch is generally the component of inductor current associated with the capacitor as discussed with respect to FIGS. 2A and 2B, as discussed above. Similarly, in situations where the second latch stores the indication of capacitor current, the indication of capacitor current stored by the second latch is generally the entire load current, as discussed above with respect to FIG. 2C.

Accordingly, as the load current plus the capacitor current, other than when the bypass switch is closed, is generally equal to the output inductor current, the controller receives a value indicative of output inductor current, for use in operation of the controller.

Figure 5:
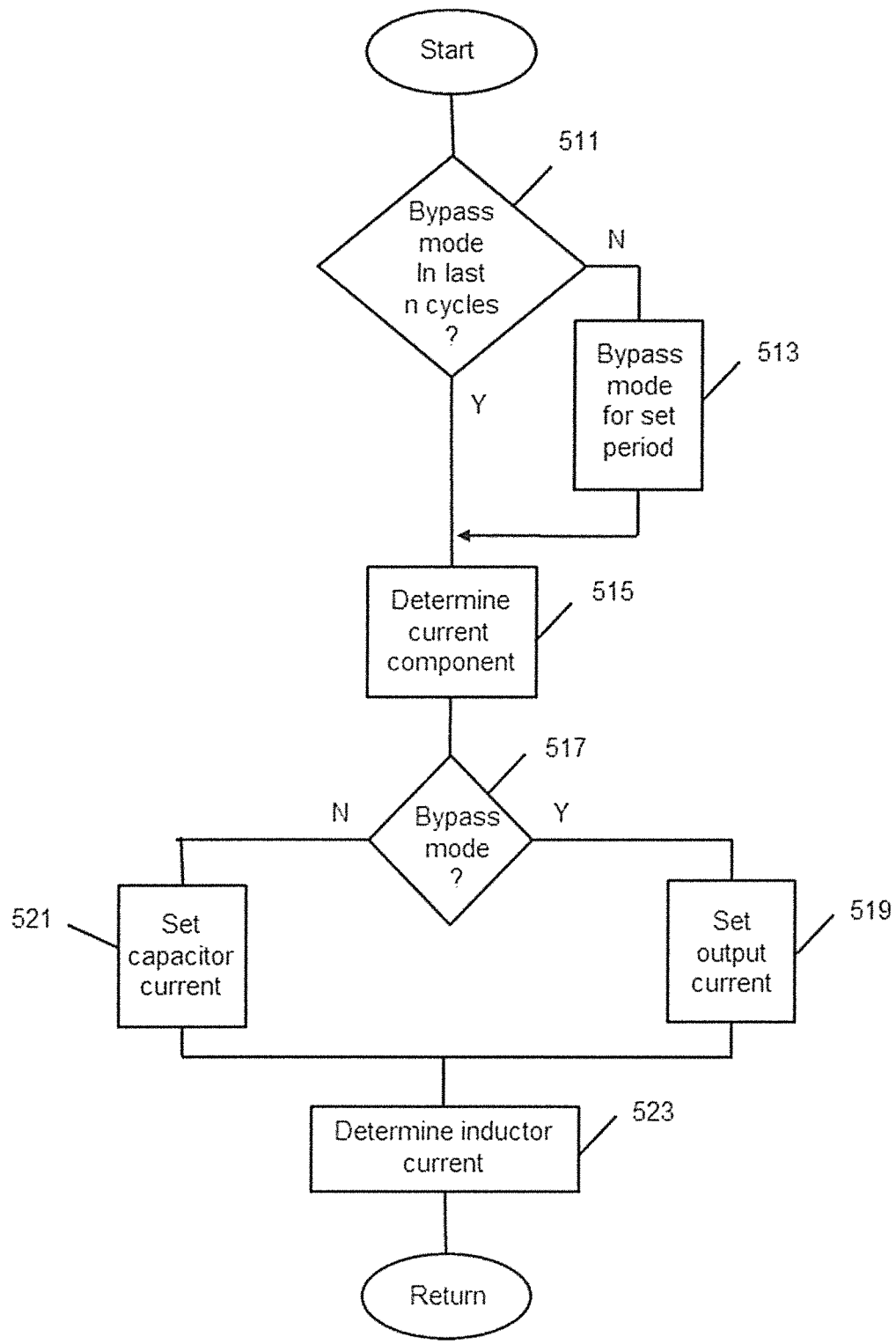
FIG. 5 is a flowchart of a process useful in controlling DC-DC voltage converters in accordance with aspects of the invention.

FIG. 5 is a flowchart of a process useful in controlling DC-DC voltage converters in accordance with aspects of the invention. In some embodiments the DC-DC voltage converter includes high side and low side switches for coupling an output inductor to either a higher or a lower voltage source, for example $V_{DD}$ and ground, and a bypass switch for coupling ends of the output inductor. In one embodiment, the process is performed by the circuitry of FIG. 3. In another embodiment, the process is performed by an integrated circuit formed by using, for example, MOSFETs. In yet another embodiment, the process is performed by a microcontroller or a processor. Program instructions for performing the process by the microcontroller or processor may be stored, for example, in a storage device such as read-only memory, flash memory, and random access memory (RAM).

In block 511, the process determines whether a bypass mode has been enabled in the last n clock cycles, where n is a number of clock cycles. When the bypass mode is enabled, for example, the bypass switch is turned on (closed) and the ends of the output inductor are coupled together. Coupling the ends of the output inductor together generally causes current to flow in a loop formed by the output inductor and closed bypass switch, as shown in FIG. 2C. Alternatively, when the bypass mode is disabled, for example, the bypass switch is turned off (open) allowing the current to flow through the output inductor and capacitor, as shown in FIGS. 2A and 2B.

If the bypass mode has been on in the last n clock cycles, the process proceeds to block 515. Otherwise, the process continues to block 513.

In block 513, the bypass mode is enabled for a set period. In some embodiments, the set period may include m clock cycles, where m is a predetermined number of clock cycles. The process then continues to block 515.

In block 515, the process determines a current component, for example a first capacitor current of the DC-DC converter shown in FIG. 1 of the invention. In some embodiments, the first capacitor current is determined by multiplying a time-derivative of voltage of the capacitor by capacitance of the capacitor. In some embodiments, the first capacitor current is determined by taking the product of the capacitance and rate of capacitor voltage change over time. In some embodiments, the first capacitor current is determined by determining the difference between capacitor voltage at a first time and capacitor voltage at a second time, and multiplying the difference by the ratio of capacitance and difference between the first time and the second time.

In block 517, the process determines whether or not the bypass mode is enabled for a present clock cycle. If the bypass mode is enabled, the process continues to block 519. Otherwise, the process continues to block 521.

In block 519, the process sets an output current value. In some embodiments, the output current is set by storing the first capacitor current obtained in block 515 into the storage device discussed above. Alternatively, the output current can, for example, be set by using a latch or flip flop (shown in FIG. 5) to store the first capacitor current. The process then continues to block 523.

In block 521, the process sets a second capacitor current value. In some embodiments, the second capacitor current is set by storing the first capacitor current obtained in block 515 into the storage device discussed above. Alternatively, the second capacitor current can, for example, be set by using a latch or flip flop (shown in FIG. 5) to store the first capacitor current. The process then continues to block 523.

In block 523, the process determines an inductor current by using the set output current value (block 519) and the set second capacitor current value (block 521). In some embodiments, the inductor current can be determined by summing the output current and the second capacitor current. The summing can, for example, be performed by the adder circuitry shown in FIG. 3. Additionally, the summing can, for example, be performed by a microcontroller or a processor. Alternatively, the summing can be performed by an adder circuitry formed by using, for example, MOSFETs. The process thereafter returns.

Although the invention has been discussed with respect to various embodiments, it should be recognized that the invention comprises the novel and non-obvious claims supported by this disclosure.

What is claimed is:

1. A method of determining output inductor current for a DC-DC switching regulator including a bypass switch coupling ends of an output inductor and an output capacitor, the output inductor having one end coupled to a node between a high side switch and a low side switch coupled in series and another end coupled to the output capacitor and a power load, comprising:
   deactivating the bypass and low side switches and activating the high side switch when a bypass mode is disabled;
   determining a first change in capacitor voltage of the output capacitor over a first time period during which the bypass switch is deactivated;
   determining a first capacitor current value based on the first change in capacitor voltage, the first time period, and a capacitance of the capacitor;
   activating the bypass switch and deactivating the low and high side switches when the bypass mode is enabled;
   determining a second change in capacitor voltage of the output capacitor over a second time period during which the bypass switch is activated;
   determining a second capacitor current value based on the second change in capacitor voltage, the second time period, and the capacitance of the capacitor; and
   summing the first capacitor current value and the second capacitor current value to obtain an indication of output inductor current.

2. A switching voltage regulator providing a regulated output voltage, the voltage regulator comprising:
   a first switch and a second switch coupled in series between a higher power source and a lower power source;
   an inductor having one end coupled between the first switch and the second switch and another end coupled to a capacitor;
   a bypass switch having ends coupled across the inductor, with the bypass switch closed in a bypass mode and open otherwise;
   a controller for generating control signals controlling the first switch, the second switch, and the bypass switch as a function of an input voltage, an output voltage, and an indication of inductor current;
   an analog to digital converter (ADC) coupled to a node between the inductor, the capacitor, and a power load, the ADC configured to convert a voltage signal on the node to a digital value and provide the output voltage to the controller;
   a current determination block configured to determine an indication of capacitor current based on capacitance of the capacitor and changes in capacitor voltage over time;
   a first latch and a second latch coupled to the current determination block, the first latch configured to store the indication of capacitor current when either the first switch or the second switch is commanded to be closed, the second latch configured to store the indication of capacitor current when the bypass switch is commanded to be closed; and
   a summer configured to produce the indication of inductor current based on the indications of capacitor current stored in the first latch and the second latch.

3. The switching voltage regulator of claim 2, wherein the controller, in the bypass mode, is configured to generate a control signal to close the bypass switch connecting the ends of the inductor together.

4. The switching voltage regulator of claim 2, wherein the controller is configured to generate control signals to close the first switch and open the second and bypass switches allowing a current to flow from the higher power source through the inductor, through the capacitor, and to a power load.

5. The switching voltage regulator of claim 2, wherein the controller is further configured to generate the control signals as a function of the load current.

6. The switching voltage regulator of claim 2, further comprising an OR block coupled to the controller, the OR block configured to provide the first latch a signal triggering the storing of the indication of capacitor current based on control signals from the controller indicating commanded states of the first and second switches.

7. The switching voltage regulator of claim 6, wherein the second latch stores the indication of capacitor current based on a control signal from the controller indicating a commanded state of the bypass switch.

* * * * *

UNITED STATES PATENT AND TRADEMARK OFFICE
CERTIFICATE OF CORRECTION

| | | |
|---|---|---|
| PATENT NO. | : 9,461,543 B2 | Page 1 of 1 |
| APPLICATION NO. | : 14/593987 | |
| DATED | : October 4, 2016 | |
| INVENTOR(S) | : Hassan Ihs and Taner Dosluoglu | |

It is certified that error appears in the above-identified patent and that said Letters Patent is hereby corrected as shown below:

In the Specification

In Column 2, Line 12, delete "s itch" and insert --switch--, therefor.

In Column 4, Line 19, after "current" insert --$I_c$--, therefor.

Signed and Sealed this
Twenty-seventh Day of March, 2018

Andrei Iancu
*Director of the United States Patent and Trademark Office*